Jan. 22, 1929.　　　　J. H. McEVOY ET AL　　　　1,699,798

PROCESS OF MAKING STRAINER BUTTONS

Filed April 7, 1927

Joseph H. McEvoy
Joseph H. McEvoy, Jr. Inventor

By Jesse R. Stone
Attorney

Patented Jan. 22, 1929.

UNITED STATES PATENT OFFICE.

JOSEPH H. McEVOY AND JOSEPH HENRY McEVOY, JR., OF HOUSTON, TEXAS.

PROCESS OF MAKING STRAINER BUTTONS.

Application filed April 7, 1927. Serial No. 181,804.

Our invention relates to a method of forming well strainer plugs primarily to be employed in well strainers to filter the sand and sediment from the fluid being produced by the well.

It has been demonstrated that the strainer portion of well strainers can best be formed by the insertion of perforated plugs into openings cut in the pipe to receive them. This is because the plugs can be more accurately and substantially formed and machined to perform the filtering operation, than can be done by making the slots or perforations directly in the pipe itself, and because the pipe is not materially weakened when thus converted into a strainer. And further, that the plug can be made of material less liable to corrosion, sand cutting, and wear, which work against the permanence and efficient operation of a strainer.

The principal difficulty experienced in constructing such a strainer is that of forming substantial and durable strainer plugs accurately made at a reasonable cost. The work connected with cutting and machining accurately the brass, or bronze, plugs now used, is a material element in the cost of strainers.

It is an object of the invention to provide a type of plug and a method of readily and cheaply forming them into an efficient screening device of more than the usual strength and durability. It is desired that the blank plug be partly completed by casting, forging, or punching in such form that a minimum of milling, or other cutting, will be required to form screening slots of the desired width in the blanks.

Figure 1:
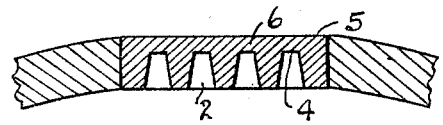
Figure 2:
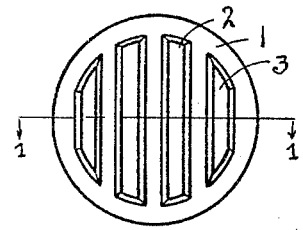
Figure 7:
Figure 8:
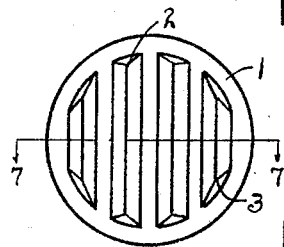
Figure 3:
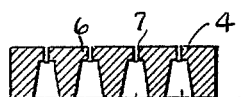
Figure 4:
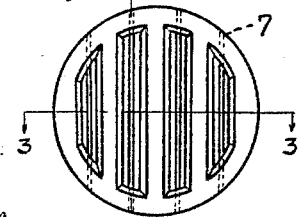
Figure 9:
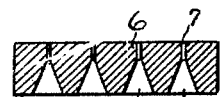
Figure 10:
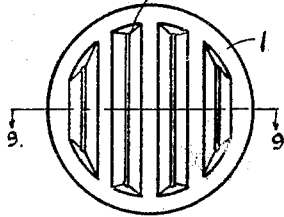
Figure 5:
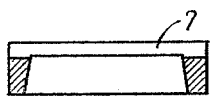
Figure 6:
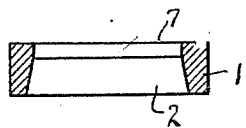

The invention relates further to certain details of construction as set forth in various modifications of the inventive idea, and to the illustration of which reference is had to the drawings herewith, in which Fig. 1 is a transverse section on the line 1—1 of Fig. 2, showing therewith a short segment of the screen pipe into whith the plugs are fitted. Fig. 2 is a bottom plan view of a strainer plug embodying our invention, this view illustrating the forged blank before the strainer slots are cut therein. Fig. 3 is a central vertical section through a strainer plug taken on the line 3—3 of Fig. 4. Fig. 4 is a bottom plan view of the plug, showing the strainer slots cut therein. Fig. 5 is a vertical section on the line 5—5 of Fig. 4. Fig. 6 is a section similar to that shown in Fig. 5, illustrating the slot as cut in a different manner from that shown in Fig. 5. Fig. 7 is a transverse section of a strainer plug before the straining slots have been cut, said plug illustrating a slightly different embodiment of the invention. Fig. 8 is a bottom plan view thereof. Fig. 9 is a transverse section on the line 9—9 of Fig. 10, and Fig. 10 is a bottom plan view of the button shown in Fig. 9, the two Figures 9 and 10 illustrating the finished button with the straining slots cut therein. Like numerals of reference designate like parts as far as possible throughout all the views.

It is considered to be a fact throughout the oil industry that the openings in a strainer to be used for filtering, particularly in wells, are more effective where the inner portion of the straining opening is formed wider than the entrance to said opening. In other words, it is considered most efficient to form the straining slots with their side walls diverging from the outer opening toward the inner face of the strainer. It is not at present possible to form openings of this character in a practicable manner so that the plug may be made economically and sold at a cost within the reach of the operator.

In overcoming this difficulty, we contemplate forming a plug shaped to fit the desired opening in the strainer pipe, the form preferable being cylindrical. We contemplate forging this plug with parallel elongated recesses on one face thereof extending to a desirable depth into the body of the blank. This may be done either while the metal is hot, or cold, but preferably when it is hot. And while we have considered forging as the most efficient method of forming these recesses in the blank, it is believed possible and practicable to form these recesses by casting, or by punching the blank, while the metal is still cold.

When the blanks have been thus formed with the recesses in one face, they will be then operated upon to cut slots into the opposite face of the plug parallel with and directly over the recesses to connect with the bottoms of the said recesses; this cutting is preferably done with a milling cutter with parallel sides. It is possible, however, that the slots may be stamped with a stamping machine of ordinary construction.

In carrying out the invention, as above described, the most common form of plug will be one of cylindrical form with its opposite ends, or faces, parallel; such a blank is disclosed in Figs. 1 to 10 inclusive. The recesses, which are forged, stamped, or cast, in the blank, may be of the form shown in Figs. 1 to 6 inclusive. In these figures are illustrated elongated recesses extending from one side to the other of the blank and ending at points spaced from the periphery of the blank to form a circular rim 1. This rim is left intact about the circumference of the plug to form a rigid ring to maintain the strength of the plug. The recesses being parallel, are of different lengths. There may be as many of these recesses as are desired, and we have shown four, there being two central recesses 2, and two outer recesses 3, shorter in length than the central ones. These recesses have inwardly converging walls and have broad inner ends, which we term bottoms 4 therein, thus providing between each of the said bottoms 4 and the outer face 5 of the blank a web, or wall 6.

When the blank has been thus forged, or otherwise formed, the plug will be set in a holder and slots 7 will be cut in the outer face of the plug to meet with the bottoms of the recesses 4. It will be noted that the slots 7 need be cut only through the web 6 to connect with the recesses and that, as the bottoms 4 of the recesses are broad, accurate placing of the cutting elements will be unnecessary, as it will make but slight difference whether the slots connect exactly with the centers of the recesses or not. The slots 7 are preferably formed with parallel walls and may best be cut in the plug by means of milling cutters mounted in spaced relation upon a mandrel so that all the slots 7 may be cut with one operation. As shown in dotted lines in Fig. 4, the slots 7 may be cut the full distance across the outer portion, or head, and through the circumferential rim 1 of the plug without materially weakening the same. The slot thus cut in the bottom is best illustrated in Fig. 5.

While the slots may be advantageously cut by the use of milling cutters, it is contemplated that they may be also punched through the wall 6 to connect with the recesses by the use of a punch of the proper construction; such a slot is illustrated at 7' in Fig. 6.

As has been stated, it will be possible to cut the slot 7 with the least amount of adjustment where the bottoms of the recesses 3 are broad, as shown at 4. It will be noted, however, that as these slots are subject to greater wear from sand, which has a tendency to, and often does, cut the walls of the said slots during the use of the strainer, the resistance to such wear in the form shown best in Fig. 3, will be materially the same from the time the cutting or sand blasting action begins until the slot is worn to the full width of the bottom of the recess. It is, therefore, best in some situations to form recesses, as shown in Fig. 7, with the walls converging more obtusely so as to meet at the bottoms of the recesses, as shown at 4' in Fig. 7. When the recesses are thus formed, there is still the same outer rim about the plug and the same wall, or web 6, to be perforated or slotted. More careful adjustment of the cutters will be required when the recesses are thus formed, but it will be noted that the slots 7 connecting with said recesses, as illustrated in Fig. 9, will present a greater resistance to wear because of the greater amount of material to be cut by the sand or other foreign materials in the liquid on each of the side walls of the slots. In both these forms there will be a narrow straining slot 7 leading to a diverging recess on the inner face of the plug, thus allowing the sand to clear away from the opening toward the inner side and decreasing the liability of clogging the opening by the sand accumulations.

The advantages of forming a strainer plug in the manner described lie in the fact that the plug may be forged and cut at a reasonable price to the consumer and when thus formed, the plug will wear for much longer periods of time than will some cheaper forms of plugs now in use. It is also obvious that plugs constructed in this manner may be made of harder material than when the plug is constructed in the ordinary manner. It will be possible to make a standard forged, or cast, blank with the recesses formed therein so that slots of varying widths may be cut in the opposite side to meet said recesses. It is to be understood that strainer plugs must have slots of different mesh or lateral widths to accord with different degrees of fineness of materials and thus accord with conditions within the well. In some wells only a coarse mesh is required, while in others a particularly fine mesh is needed. In a plug formed in accordance with our invention, the slots may be of any width desired and the same forged blank will be capable of use for all sizes of slots. The further advantages of this construction will be apparent to those skilled in the art.

Having thus described our invention, what we claim as new and desire to protect by Letters Patent is:

1. A process of forming strainer plugs for well strainers comprising forging in one face of a blank a series of parallel recesses, shaping the blank to fit the desired screen opening, and cutting slots in the opposite face of the blank to meet the bottoms of said recesses.

2. A process of forming strainer plugs for well strainers comprising forging a blank with broad parallel recesses on one face thereof and then milling on the opposite face a series of slots parallel with said recesses and connecting therewith to form filter openings.

3. A process of forming strainer plugs for well strainers comprising forging a blank plug with broad bottomed recesses therein on one side, then cutting slits narrower than said recesses in the opposite side to connect with the bottoms of said recesses.

4. A process of forming strainer plugs for well strainers, comprising forging a blank disc with parallel recesses extending across said blank, but ending short of the edge of said blank at each end to form an outer rim, then cutting slots in the opposite side of said blank to connect with the bottoms of said recesses.

5. A process of forming strainer plugs for well strainers comprising forging a blank circular disc shaped to fit an opening in the strainer, forming in said disc during the forging operation a longitudinal recess on one side extending part way through the same, then cutting a slit in the opposite side of said button to register with said recess and form an opening through the said plug.

In testimony whereof we hereunto affix our signatures April, A. D. 1927.

JOSEPH H. McEVOY.
JOSEPH HENRY McEVOY, Jr.